(12) United States Patent
Matsushita et al.

(10) Patent No.: US 8,329,080 B2
(45) Date of Patent: Dec. 11, 2012

(54) CONDUCTIVE COMPOSITION, ELECTROPHOTOGRAPHIC BELT, IMAGE FORMING APPARATUS, AND METHOD OF MANUFACTURING CONDUCTIVE COMPOSITION

(75) Inventors: Makoto Matsushita, Osaka (JP); Chiyoshi Nozaki, Shiga (JP); Shuuichi Nakagawa, Osaka (JP); Akira Izutani, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/078,443

(22) Filed: Apr. 1, 2011

(65) Prior Publication Data

US 2011/0249994 A1 Oct. 13, 2011

(30) Foreign Application Priority Data

Apr. 13, 2010 (JP) .................. 2010-091979

(51) Int. Cl.
*G03G 15/16* (2006.01)
*H01B 1/24* (2006.01)

(52) U.S. Cl. ............... 264/177.1; 399/308; 252/511

(58) Field of Classification Search .......... 399/308; 252/511; 264/177.1
See application file for complete search history.

(56) References Cited

U.S. PATENT DOCUMENTS

| 7,697,874 B2 | 4/2010 | Izutani et al. |
| 7,831,182 B2 | 11/2010 | Konishi et al. |
| 7,865,118 B2 | 1/2011 | Nakagawa et al. |
| 2008/0069594 A1 | 3/2008 | Izutani |
| 2008/0069599 A1 | 3/2008 | Nakamura et al. |
| 2008/0131174 A1 | 6/2008 | Inoue et al. |
| 2008/0175626 A1 | 7/2008 | Murayama et al. |
| 2008/0232857 A1 | 9/2008 | Matsumoto et al. |
| 2009/0041512 A1 | 2/2009 | Murayama et al. |
| 2009/0060540 A1 | 3/2009 | Matsushita et al. |
| 2009/0142107 A1 | 6/2009 | Akira et al. |
| 2010/0028057 A1 | 2/2010 | Yamada et al. |
| 2010/0150609 A1 | 6/2010 | Nozaki et al. |
| 2010/0296848 A1 | 11/2010 | Yamamoto et al. |
| 2011/0008069 A1 | 1/2011 | Matsushita et al. |

FOREIGN PATENT DOCUMENTS

| EP | 2002-304065 | * 10/2002 |
| JP | 4-22013 | 1/1992 |
| JP | 6-228335 | 8/1994 |
| JP | 2560727 | 9/1996 |
| JP | 2845059 | 10/1998 |
| JP | 2916049 | 4/1999 |
| JP | 3275394 | 2/2002 |
| JP | 3278934 | 2/2002 |
| JP | 2002-241562 | 8/2002 |
| JP | 3461005 | 8/2003 |
| JP | 3738628 | 11/2005 |
| JP | 3826723 | 7/2006 |

* cited by examiner

*Primary Examiner* — Robert D. Harlan (74) *Attorney, Agent, or Firm* — Oblon, Spivak, McClelland, Maier & Neustadt, L.L.P.

(57) ABSTRACT

A conductive composition including a matrix resin comprising a thermoplastic resin, a conductive agent comprising a carbon black having an amine value of 1 to 100 mgKOH/g, and a stiffening agent comprising an acid anhydride, a carboxylic acid, or a compound having an epoxy group.

20 Claims, 2 Drawing Sheets

FIG. 1

CONDUCTIVE COMPOSITION, ELECTROPHOTOGRAPHIC BELT, IMAGE FORMING APPARATUS, AND METHOD OF MANUFACTURING CONDUCTIVE COMPOSITION

CROSS-REFERENCE TO RELATED APPLICATIONS

The present patent application claims priority pursuant to 35 U.S.C. §119 from Japanese Patent Application No. 2010-091979, filed on Apr. 13, 2010, which is hereby incorporated by reference herein in its entirety.

BACKGROUND

1. Field of the Invention

The present invention relates to a conductive composition, and an electrophotographic belt and an image forming apparatus using the conductive composition. The present invention also relates to a method of manufacturing the conductive composition.

2. Description of the Background

Endless belts are widely used as components of intermediate transfer devices, developing devices, or photoconductor devices in electrophotographic copiers and laser beam printers. For example, an electrophotographic image forming apparatus employs an endless belt as a transfer belt onto which a toner image is transferred. The transfer belt is required to have a stable electric resistivity, mechanical strength, and a long lifespan. To meet these requirements, thermosetting resins such as polyimide and polyamide-imide have been used for the transfer belt.

Polyimide and polyamide-imide are generally formed by subjecting a fluid varnish to processes of application, drying, and curing. Because the curing process takes a long time, polyimide and polyamide-imide cannot be continuously produced. Also, unit prices of polyimide and polyamide-imide are high. Polyimide and polyamide-imide containing conductive particles, such as carbon black, to have a certain electric resistivity, have high elasticity and are resistant to stretch. However, they need reinforcing tape on their ends because they are easily breakable, resulting in cost rise.

In view of this situation, there is an approach for using thermoplastic resins in place of thermosetting resins. Unlike thermosetting resins, thermoplastic resins can be continuously produced at low cost. But they are unstable in electric resistivity and unresistant to creep or stretch, which may result in a short life span.

In attempting to solve such problems, various conductive compositions have been proposed.

For example, Japanese Patent Application Publication No. (hereinafter JP-A) 2002-241562 proposes a conductive composition comprising a fluoropolymer, a conductive compound, and a tri-block copolymer. JP-04-022013-A proposes a composite body comprising a flexible conductive sheet covered with a conductive polymer.

However, neither of them has satisfactory manufacturability, electric property, and durability.

Japanese Patent No. 3738628 discloses a composition comprising a polyamide, a thermoplastic resin having a specific viscoelasticity, and a compatibilizing agent. However, the compatibilizing agent (e.g., vinyl graft polymer, acrylonitrile-styrene copolymer, maleic anhydride) does not satisfactorily improve resistant to creep or crack. There is no mention of stabilization of electric resistivity.

Japanese Patent Application Publication No. 2002-304065 proposes an electrophotographic belt comprising a fluorine-based binder and an epoxy-resin-covered carbon black, to which an additive having an amine value of 5 to 120 is adhered. But this composition has poor strength and stiffness.

SUMMARY

Exemplary aspects of the present invention are put forward in view of the above-described circumstances, and provide a novel conductive composition having stable electric resistivity, resistance to creep, stretch, and crack, and a long lifespan, and an electrophotographic belt and an image forming apparatus using the conductive composition.

In one exemplary embodiment, a novel conductive composition includes a matrix resin comprising a thermoplastic resin, a conductive agent comprising a carbon black having an amine value of 1 to 100 mgKOH/g, and a stiffening agent comprising an acid anhydride, a carboxylic acid, or a compound having an epoxy group.

Other exemplary aspects of the present invention are put forward in view of the above-described circumstances, and provide a novel method of manufacturing the conductive composition that costs low.

In one exemplary embodiment, a novel method of manufacturing conductive composition includes melt-kneading a matrix resin comprising a thermoplastic resin, a conductive agent comprising a carbon black having an amine value of 1 to 100 mgKOH/g, and a stiffening agent comprising an acid anhydride, a carboxylic acid, or a compound having an epoxy group, so that amino groups on a surface of the carbon black react with functional groups of the stiffening agent, and extrusion-molding the melt-kneaded composition.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Exemplary aspects of the invention provides a conductive composition comprising a matrix resin comprising a thermoplastic resin, a conductive agent comprising a carbon black having an amine value of 1 to 100 mgKOH/g, and a stiffening agent comprising an acid anhydride, a carboxylic acid, or a compound having an epoxy group.

Amino groups on the surface of the carbon black form strong chemical or ionic bonds with the stiffening agent. For example, amino groups form imide bonds with an acid anhydride, a carboxylic acid, or a dicarboxylic dimer. Thus, the carbon black can be finely dispersed without reaggregating, providing stable electric resistivity and crack resistance. Additionally, the stiffening agent and the matrix resin can form a strong network upon exposure to electron beam.

In an exemplary embodiment described below, the conductive composition is used for an intermediate transfer belt in an image forming apparatus.

The intermediate transfer belt is repeatedly exposed to hazards such as applied voltage, rotary drive, and friction in the image forming apparatus. Thus, to give crack and creep resistance and stable electric property to the intermediate transfer belt, the carbon black having a specific amine value is reacted with the stiffening agent (such as an acid anhydride, a carboxylic acid, or a compound having an epoxy group) so that amino groups on the surface of the carbon black are reacted with the acid anhydride, carboxylic acid, or epoxy group, to form chemical or ionic bonds, which are stronger than van der Waals force.

Figure 2:
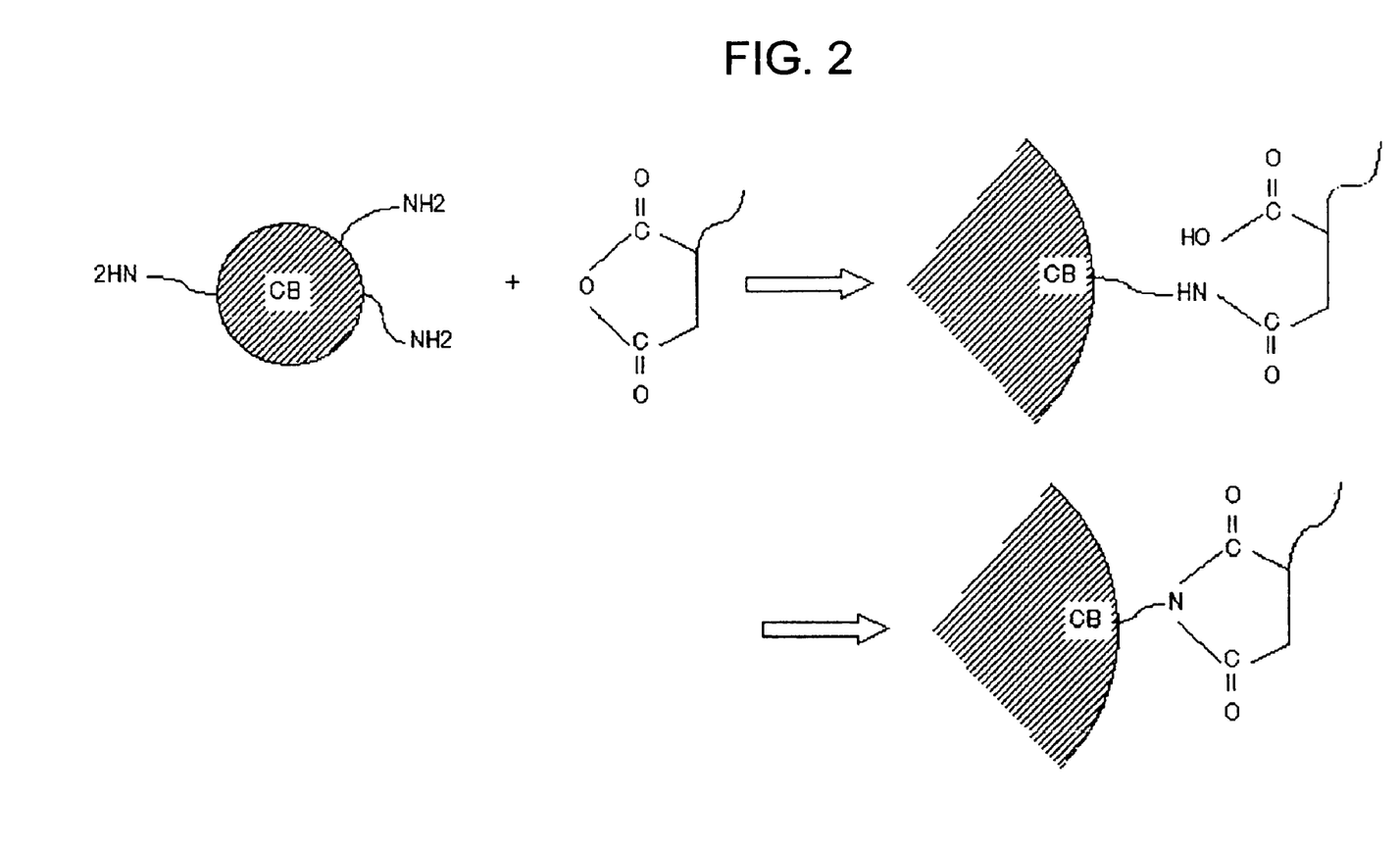
FIG. 2 illustrates a reaction between amino groups on the surface of the carbon black and an acid anhydride (i.e., ethylene-maleid anhydride copolymer) that forms strong bonds.

FIG. 2 illustrates a reaction between amino groups on the surface of the carbon black and an acid anhydride (i.e., ethylene-maleic anhydride copolymer) that forms strong bonds.

The matrix resin comprises a thermoplastic resin. The matrix resin can be manufactured by any method, and is preferably manufactured through the processes of melt extrusion and succeeding electron beam treatment. The electron beam treatment accelerates cross-linking of unreacted portions, thus improving mechanical strength.

Specific examples of suitable thermoplastic resins include, but are not limited to, polyvinylidene fluoride, polyethylene, polypropylene, and polyester. Among these resins, polyvinylidene fluoride is most preferable.

Alternatively, the matrix resin may comprise a blended polymer. The blended polymer may include two or more of the above-described thermoplastic resins.

The blended polymer preferably includes at least one polymer having a vinyl group (—C=C—). Such a polymer easily cross-links with a stiffening agent having a vinyl group and improves resistivity stability and mechanical strength. The cross-linking reaction is preferably accelerated by electron beam exposure.

The content of the polymer having a vinyl group in the blended polymer is preferably 1 to 50% by weight, more preferably 1 to 20% by weight, based on the main polymer having the greatest content, to have mechanical strength.

The conductive agent comprises a carbon black having an amine value of 1 to 100 mgKOH/g.

When the amine value is too small, the carbon black may form less chemical bonds between the stiffening agent. When the amine value is too large, the carbon black may include excessive impurities, resulting in poor mechanical strength. More preferably, the carbon black has an amine value of 5 to 80 mgKOH/g.

Amine value of amine-modified carbon black can be measured by, for example, nitrogen analysis based on the semimicro-Kjeldahl method or a direct titration method using hydrochloric acid. In this specification, primary amino group nitrogen content (%) is measured according to a method based on JIS K7245 (Plastics—Amine epoxide hardeners—Determination of primary, secondary and tertiary amine group nitrogen content), and converted it into primary amine value (mgKOH/g).

When the amine-modified carbon black is kneaded with the matrix resin including an acid anhydride, a carboxylic acid, or a compound having an epoxy group, amino groups on the carbon black form strong bonds between the acid anhydride, carboxylic acid, or epoxy group, thereby forming a network. Thus, the carbon black never reaggregates upon electrification and provides stable electric properties. Additionally, the network improves mechanical strength.

The amine-modified carbon black can be prepared by, for example, treating a carbon black with a diamine; nitrating a carbon black with a fuming nitric acid and reducing the nitro group with ammonia water or sodium hydrosulfate; or treating an acid carbon black with a polyamide having amide group and terminal amide group, such as nylon, using acid-base interaction.

Specific examples of suitable carbon blacks include, but are not limited to, acetylene black, furnace black, channel black, and ketjen black. Among these carbon blacks, acetylene black is most preferable.

The stiffening agent comprises an acid hydride, a carboxylic acid, or a compound having an epoxy group.

Specific examples of the acid anhydrides include, but are not limited to, ethylene-maleic anhydride copolymer and styrene-maleic anhydride copolymer.

Specific examples of the carboxylic acids include, but are not limited to, poly(maleic acid-co-olefin).

Specific examples of the compounds having an epoxy group include, but are not limited to, poly(bisphenol A-co-epichlorohydrin) glycidyl end-capped.

Alternatively, the stiffening agent may comprise a copolymer. When one of the copolymerized polymers has a solubility parameter similar to that of the matrix resin, the stiffening agent and the matrix resin are well compatible with each other or have strong interfacial binding force therebetween, thereby improving mechanical strength.

Solubility parameter (SP) is the square root of the cohesive energy density, and is available from various publications, such as Polymer Handbook (Second Edition), for example. When solubility parameter is not available from any publication, it can be calculated from the boiling point. Table 1 shows solubility parameters $(MJ/m^3)^{1/2}$ of several materials quoted from "Oishi, Koubunshi Zairyou no Taikyuusei, p. 74, Kogyo Chosakai Publishing Co., Ltd."

TABLE 1

| | | Solubility Parameter$((MJ/m^3)^{1/2})$ | |
|---|---|---|---|
| Abbreviation | Polymer | Theoretical Value | Measured Value |
| PTFE | Polytetrafluoroethylene | 12.7 | |
| SI | Polydimethylsilicone (Silicone rubber) | 14.9 | |
| PIB | Polyisobutylene | 15.8 | 16.5 |
| PE | Polyethylene | 16.6 | 16.2 |
| PP | Polypropylene | 16.6 | |
| IR | Polyisoprene (Natural rubber) | 16.7 | 16.2 |
| BR | Polyisobutadiene | 17.1 | 17.2-17.6 |
| SBR | Polybutadiene/ Styrene = 85/15 | 17.2 | 17.4 |
| SBR | Polybutadiene/ Styrene = 75/25 | 17.5 | 17.6 |
| PS | Polystyrene | 18.7 | 18.6 |
| — | Polystyrene/ Divinylbenzene | 18.6 | — |
| NBR | NBR (Nitrile 25%) | 18.9 | 19.2-19.4 |
| PMMA | Polymethyl methacrylate | 18.9 | 18.4-19.4 |
| CR | Polychloroprene (Neoprene) | 19.2 | 18.9 |
| TR | Polysulfide rubber (Thiocol) | 18.4-19.2 | |
| PVAC | Polyvinyl acetate | 19.2 | |
| PVC | Polyvinyl chloride | 19.6 | 19.4 |
| — | Polymethylchloroacrylate | 20.7 | |
| CN | Cellulose dinitrate (Nitrocellulose) | 21.4 | |
| PET | Polyethylene terephthalate | 21.9 | |
| PC | Polycarbonate | 20.1 | |
| CA | Cellulose acetate | 23.2 | 22.3 |
| POM | Polyacetal (Homopolymer) | 22.9 | |
| PAN | Polyacrylonitrile | 26.1 | |
| EP | Epoxy | About 22.5 | |
| PA | Polyamide (Nylon 66) | 27.8 | |

The stiffening agent preferably has a vinyl group (—C=C—). As described above, the stiffening agent having a vinyl group and the matrix resin comprising the blended polymer comprising a polymer having a vinyl group easily cross-link with each other and improves resistivity stability and mechanical strength. The cross-linking reaction is preferably accelerated by electron beam exposure.

The difference in solubility parameter between the stiffening agent having a vinyl group and the polymer having a vinyl group is preferably 3 or less. In this case, the distance between the vinyl groups becomes much shorter and more easy to cross-link upon expose to electron beam, resulting in high mechanical strength.

The conductive composition may further include materials other than the matrix resin, conductive agent, and stiffening agent, if needed.

An exemplary method of manufacturing the conductive composition is described below. First, raw materials are blended and mixed using, for example, a twin screw extruder, which is suitable for uniformly dispersing the conductive agent (i.e., carbon black). To more improve dispersibility, the raw materials can be physically and mechanically mixed using a hybridization system.

The raw materials thus mixed are then pelletized. The pelletized raw materials (hereinafter the "pellet") may be subject to dehumidification and drying so that the moisture percentage becomes about 0.05% by weight or less. In case moisture remains, there is a possibility that bubbles are formed in the product. The mixing and pelletizing processes are preferably performed under a poorly-reactive gas atmosphere (e.g., nitrogen gas, carbon dioxide gas) or an inert gas atmosphere (e.g., helium gas) so as not to vary molecular weights of the resins. It is to be noted that the volume electric resistivity of the pellet is variable depending on the mixing conditions. The dehumidification and drying are preferably performed in a poorly-reactive gas atmosphere or an inert gas atmosphere. The mixing and pelletizing processes are preferably performed at low temperatures. A lubricant may be mixed with the raw materials so as not to reduce molecular weights of the resins, if needed.

The pellet is then formed into a tubular film or sheet. (Sheets are thicker than films.) The film or sheet can be formed by, for example, an extrusion film formation using a circular die. In the extrusion film formation using a circular die, it is preferable that conditions of a sizing part, such as an inside or outside mandrel, are properly adjusted. Specifically, suitable materials for the sizing part and the cooling temperature of the sizing part are preferably selected depending on the kind and electric resistivity of the matrix resin in use and the film thickness. Thus, a tubular film is reliably formed and the sizing part is prevented from being contaminated with decomposed monomers. Preferably, the sizing part is cooled by circulating cooling water having a temperature of 0 to 90° C., more preferably 20 to 60° C. The extruded tubular film is preferably drawn out without folding. For example, the extruded tubular film can be drawn out using a caterpillar conveyer having a soft clutch that softly presses the extruded tubular film without folding. It is preferable that the extruded tubular film is drawn out while contacting at as a large contact area as possible.

The volume electric resistivity of the resulting film mainly depends on film formation conditions as well as the amount of the conductive agent. In order that the film has a desired volume electric resistivity within a constant fluctuation range, film formation conditions are carefully controlled. For example, in the extrusion film formation process, the screw shape, extrusion amount, and temperature are precisely controlled so that the resulting film condition is not influenced by various factors such as fluidity or viscosity of the blended raw materials and pressure within the extruder. The pressure within the extruder can be controlled by a commercially-available gear pump that can quantitatively introduce a melted resin into the die.

The volume electric resistivity is likely to fluctuate in a perpendicular direction (i.e., the circumferential direction of the tube) to the extrusion direction (i.e., the axial direction of the tube). Therefore, preferably, the temperature of the circular die is precisely and properly controlled. For example, the temperature of the circular die is preferably controlled in step-by-step manner in the circumferential direction, so that the temperature of a resin is preferably controlled at an accuracy of ±1° C., more preferably ±0.5° C., within the die.

To more improve dimension accuracy, the extruded film may be further subjected to sizing or drawing. When subjecting the extruded film to the drawing, draw ratios between lateral and vertical directions (i.e., the axial and circumferential directions of the tube) should be properly controlled because it changes the volume electric resistivity of the resulting film by changing contact condition between each conductive carbon black therein.

The above-described method can produce a tubular film having excellent smoothness and dimension accuracy in diameter and thickness while controlling the volume electric resistivity within a constant fluctuation range. Of course, such a tubular film can be obtained by other methods, but the above-described method is advantageous in controlling electric resistivity and dimension accuracy and is preferable for producing a functional belt having functions of memory, electrostatic control, conveyance, etc.

By cutting the tubular film in a perpendicular direction (i.e., the circumferential direction of the tube) to the extrusion direction (i.e., the axial direction of the tube) at a specific cutting interval, seamless conductive belts can be obtained. The width of the seamless belts can be easily and arbitrarily changed by changing the cutting interval.

Such seamless belts can also be obtained by known methods such as continuous melt extrusion molding methods, injection molding methods, blow molding methods, and inflation film molding methods. Among these methods, continuous melt extrusion molding methods are preferable. In particular, downward extrusion methods such as vacuum sizing method or internal cooling mandrel method, which can control the inner diameter of the extruded tube with high accuracy, are most preferable. When the inner diameter is 30 mm or more, the internal cooling mandrel method is preferable. When the inner diameter is 30 mm or less, the vacuum sizing method is preferable.

Specific examples of usable matrix resins further include polycarbonate resins described in JP-06-95521-A; PVDF (polyvinylidene fluoride) described in JP-05-200904-A and JP-06-228335-A; polyalkylene phthalate described in JP-06-149081-A; blended materials of PC (polycarbonate) and PAT (polyalkylene terephthalate) described in JP-06-149083-A; and blended materials of ETFE (ethylene-tetrafluoroethylene copolymer) and PC, ETFE and PAT, and PC and PAT, described in JP-06-149079-A. Additionally, polyimide resins described in JP-63-311263-A equivalent to Japanese Patent No. 2560727) are also usable. The disclosures of the above publications are incorporated herein by reference.

The conductive composition can also be used for electrophotographic belts other than the intermediate transfer belt, such as paper conveyance belts.

The intermediate transfer belt is a member onto which a toner image is primarily transferred from an image bearing member by applying a bias having the opposite polarity to that of the toner at a primary transfer area, and from which the toner image is transferred onto a recording medium by applying a bias having the opposite polarity to that of the toner at a secondary transfer area.

Exemplary aspects of the invention further provide an image forming apparatus comprising an image bearing member; an electrostatic latent image forming device to form an electrostatic latent image on the image bearing member; a developing device to develop the electrostatic latent image with a toner to form a toner image; a primary transfer device to transfer the toner image from the image bearing member onto the intermediate transfer belt according to the present invention; a secondary transfer device to transfer the toner image from the intermediate transfer belt onto a recording medium; and a fixing device to fix the toner image on the recording medium.

Figure 1:
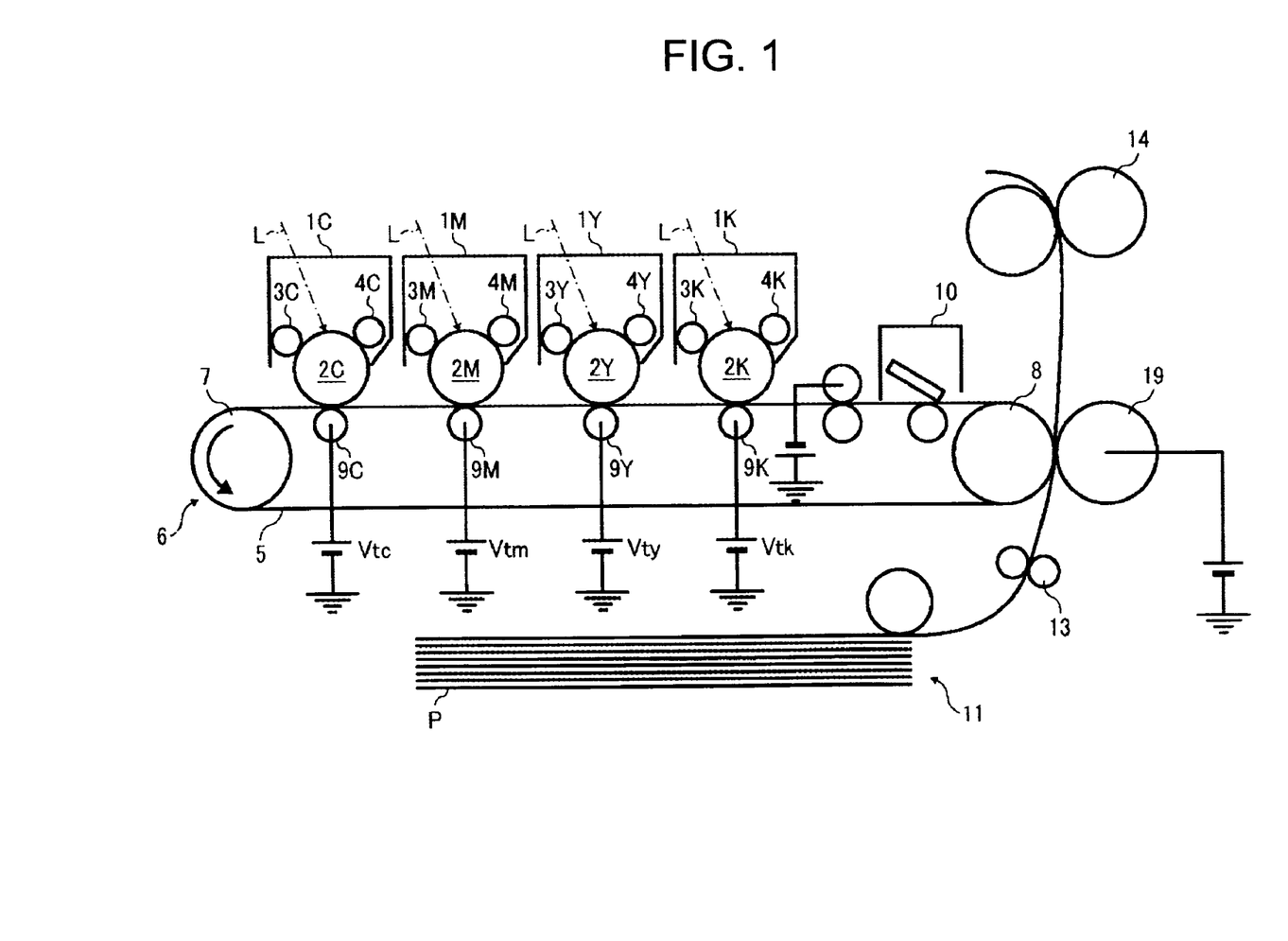
FIG. 1 schematically illustrates an embodiment of an image forming apparatus according to exemplary aspects of the invention.

FIG. 1 schematically illustrates an embodiment of an image forming apparatus according to exemplary aspects of the invention. The image forming apparatus includes process units 1K, 1Y, 1M, and 1C containing toners of black, yellow, magenta, and cyan, respectively. Since the process units 1K, 1Y, 1M, and 1C have the same configuration, only the process unit 1K is described in detail below. The process unit 1K includes a drum-like photoconductor 2K (i.e., the image bearing member); a charging member 3K to uniformly charge the photoconductor 2K; a developing roller 4K (i.e., the developing device) to develop an electrostatic latent image on the photoconductor 2K; and a cleaning member to remove residual toner particles from the photoconductor 2K. A surface of the photoconductor 2K is uniformly charged by the charging member 3K and the charged surface is then irradiated and scanned with a laser light beam L emitted from an irradiator (i.e., the electrostatic latent image forming device), thus forming a black electrostatic latent image. The black electrostatic latent image is developed into a black toner image at a developing area where the photoconductor 2K is facing the developing roller 4K. The black toner image is then transferred from the photoconductor 2K onto an intermediate transfer belt 5 by a primary transfer roller 9K in an intermediate transfer unit 6. Residual toner particles remaining on the photoconductor 2K without being transferred are removed by the cleaning member. Subsequently, the photoconductor 2K is neutralized and charged by the charging member 3K again to be ready for a next image formation. In the remaining process units 1Y, 1M, and 1C, respective toner images of yellow, magenta, and cyan are formed on the respective photoconductors 2Y, 2M, and 2C in the same manner.

The intermediate transfer unit 6 including the intermediate transfer belt 5 is provided below the process units 1K, 1Y, 1M, and 1C in FIG. 1. The intermediate transfer belt 5 is stretched across a driving roller 7 and a support roller 8 and is rotated in the direction indicated by arrow in FIG. 1. Primary transfer rollers 9K, 9Y, 9M, and 9C (i.e., the primary transfer devices) are provided facing the inner surface of the intermediate transfer belt 5 so as to form primary transfer nips with the respective photoconductors 2K, 2Y, 2M, and 2C therebetween. A primary transfer bias Vt, having the opposite polarity to the toner charge, is applied from a power source to each of the primary transfer rollers 9K, 9Y, 9M, and 9C. The toner images of black, yellow, magenta, and yellow are sequentially superimposed on one another on the intermediate transfer belt 5 by the action of electric field and pressure in the primary transfer nips, while the intermediate transfer belt 5 is seamlessly moving.

In the intermediate transfer unit 6, a secondary transfer roller 19 (i.e., the secondary transfer device) and an intermediate transfer belt cleaning device 10 are further provided facing the outer surface of the intermediate transfer belt 5. The secondary transfer roller 19 is pressed against the intermediate transfer belt 5 while facing the support roller 8, thus forming a secondary transfer nip therebetween. A predetermined secondary transfer bias is applied from a power source to the secondary transfer roller 19.

A paper feed cassette 11 storing multiple sheets of a recording paper P is provided below the intermediate transfer unit 6. The recording paper P is fed from the paper feed cassette 11 to paper feed paths by rotation of a paper feed roller 12 and is sandwiched by a pair of registration rollers 13. The pair of registration rollers 13 feeds the recording paper P toward the secondary transfer nip in synchronization with an entry of the composite toner image, in which toner images of black, yellow, magenta, and cyan are superimposed on one another, on the intermediate transfer belt 5 into the secondary transfer nip.

The composite toner image is transferred from the intermediate transfer belt 5 onto the recording paper P by the action of electric field and pressure in the secondary transfer nip, thus forming a full-color toner image on the white recording paper P. Residual toner particles remaining on the intermediate transfer belt 5 without being transferred in the secondary transfer nip are removed by the cleaning device 10.

Further, a fixing device 14 is provided above the secondary transfer nip in FIG. 1. The recording paper P separated from the intermediate transfer belt 5 and the secondary transfer roller 19 is discharged from the secondary transfer nip and then fed to the fixing device 14. The fixing device 14 includes a fixing roller internally containing a heat source and a pressing roller pressed against the fixing roller to form a fixing nip therebetween. The full-color toner image is fixed on the recording paper P by application of heat and pressure while the recording paper P passes through the fixing nip. The recording paper P having the fixed full-color toner image is finally discharged from the image forming apparatus.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

A mixture of 100 g of a carbon black SB4 (from Degussa), 20 g of hexamethylenediamine (HMDA from Aldrich), and pure water is subjected to a bead mill dispersion treatment for 24 hours at 60° C., followed by washing and drying. Thus, an amine-modified carbon black having an amine value of 10 is prepared.

Next, 100 g of the amine-modified carbon black and 100 g of an ethylene-maleic anhydride copolymer BONDINE (from Arkema) having the following formula (1), as the stiffening agent, are kneaded using a LABO PLASTOMILL (from Toyo Seiki Seisaku-sho, Ltd.), to prepare a carbon black dispersion.

(1)

Next, 1.0 kg of PVDF (KF1100 from Kureha Corporation) and 200 g of the carbon black dispersion are kneaded using a LABO PLASTOMILL, followed by pelletizing. Thus, a conductive composition pellet is prepared. The pellet is extruded by a melt extruder equipped with a T die, to prepare a film having a thickness of 100 μm.

The film is subjected to the following evaluations.

Evaluation of Resistivity Stability

Resistivity stability is evaluated from the viewpoints of voltage dependency and conductance degradability.

The voltage dependency is evaluated by measuring $\rho V10v/\rho V100v$, $\rho V10v$ and $\rho V100v$ each representing a volume resistivity when a respective voltage of 10V and 100V is applied. When $\rho V10v/\rho V100v$ is less than 2, the voltage dependency rank is A. When $\rho V10v/\rho V100v$ is not less than 2, the voltage dependency rank is B.

The conductance degradability is evaluated by measuring $\rho V(D)/\rho V(I)$, $\rho V(D)$ representing a volume resistivity when a voltage of 100V is applied while DC current of 10 μA is being applied, and $\rho V(I)$ representing an initial volume resistivity. When $\rho V(D)/\rho V(I)$ is not less than 0.01 and less than 2, the conductance degradability rank is A. When $\rho V(D)/\rho V(I)$ is less than 0.01 or not less than 2, the conductance degradability rank is B.

When both the voltage dependency and conductance degradability ranks are A, the resistivity stability is GOOD. When one of the voltage dependency and conductance degradability ranks is A, the resistivity stability is AVERAGE. When both the voltage dependency and conductance degradability ranks are B, the resistivity stability is POOR.

When only the voltage dependency rank was B, defective images are found to be produced from the initial stage. When only the conductance degradability rank is B, defective images are found to be gradually produced with time.

Evaluation of Mechanical Strength

Mechanical strength is evaluated based on a method according to JIS P 8115 (2002). Specifically, the film is cut into a specimen having a width of 13.5 mm and a length of 150 mm, and the specimen is subjected to a flexing test to determine how many times the specimen is resistant to flexing with a load of 1 kg. When the specimen is resistant to 3,000 times or more of flexing, the mechanical strength is GOOD. When the specimen is not resistant to 3,000 times or more of flexing, the mechanical strength is AVERAGE.

Evaluation of Crack

The film is mounted on a printer IPSIO SP C310 (from Ricoh Co., Ltd.) as an intermediate transfer belt. After the printer produced 90,000 sheets of an image, the intermediate transfer belt is visually observed to determine whether crack appeared or not. When a surface or end of the belt is slightly deformed but no crack appeared, while the produced image quality has no problem, the crack rank is GOOD. When a surface or end of the belt is deformed and crack slightly appeared thereon, while the produced image quality has no problem, the crack rank is AVERAGE. When a surface or end of the belt is deformed, crack appeared thereon, and the produced image quality is poor, the crack rank is POOR.

Evaluation of Tensile Strength

Tensile strength is measured based on a method according to JIS K 7113. Specifically, the film is cut into a specimen having a width of 10 mm and a length of 100 mm. The specimen is subjected to a tensile tester at a tension rate of 50 mm/min and a chuck interval of 50 mm. When the tensile strength is 60 MPa or more, the film is unlikely to be scratched, thus evaluated to be GOOD. When the tensile strength is less than 50 MPa, the film is likely to be scratched, thus evaluated to be POOR. When the tensile strength is 50 MPa to less than 60 MPa, the film is evaluated to be AVERAGE.

Example 2

A mixture of 100 g of a carbon black SB5 (from Degussa), 20 g of hexamethylenediamine (HMDA from Aldrich), and pure water is subjected to a bead mill dispersion treatment for 24 hours at 60° C., followed by washing and drying. Thus, an amine-modified carbon black having an amine value of 9 is prepared.

Next, 100 g of the amine-modified carbon black and 100 g of a styrene-maleic acid half ester (ARASTAR 700 from Arakawa Chemical Industries, Ltd.) having the following formula (2), as the stiffening agent, are kneaded using a LABO PLASTOMILL (from Toyo Seiki Seisaku-sho, Ltd.), to prepare a carbon black dispersion.

Next, 1.0 kg of PC (S-3000 from Mitsubishi-Engineering Plastics Corporation) and 200 g of the carbon black dispersion are kneaded using a LABO PLASTOMILL, followed by pelletizing. Thus, a conductive composition pellet is prepared. The pellet is extruded by a melt extruder equipped with a T die, to prepare a film having a thickness of 100 μm.

Example 3

A mixture of 100 g of a carbon black SB4 (from Degussa), 20 g of hexamethylenediamine (HMDA from Aldrich), and pure water is subjected to a bead mill dispersion treatment for 24 hours at 60° C., followed by washing and drying. Thus, an amine-modified carbon black having an amine value of 10 is prepared.

Next, 100 g of the amine-modified carbon black and 100 g of a styrene-maleic acid half ester (ARASTAR 700 from Arakawa Chemical Industries, Ltd.) having the formula (2), as the stiffening agent, are kneaded using a LABO PLASTOMILL (from Toyo Seiki Seisaku-sho, Ltd.), to prepare a carbon black dispersion.

Next, 1.0 kg of PBT (NOVADURAN 5010 from Mitsubishi-Engineering Plastics Corporation) and 200 g of the carbon black dispersion are kneaded using a LABO PLASTOMILL, followed by pelletizing. Thus, a conductive composition pellet is prepared. The pellet is extruded by a melt extruder equipped with a T die, to prepare a film having a thickness of 100 μm.

Example 4

A mixture of 100 g of a carbon black SB4 (from Degussa), 20 g of hexamethylenediamine (HMDA from Aldrich), and pure water is subjected to a bead mill dispersion treatment for 24 hours at 60° C., followed by washing and drying. Thus, an amine-modified carbon black having an amine value of 10 is prepared.

Next, 100 g of the amine-modified carbon black and 100 g of a poly(maleic acid-co-olefin) having the following formula (3), as the stiffening agent, are kneaded using a LABO PLASTOMILL (from Toyo Seiki Seisaku-sho, Ltd.), to prepare a carbon black dispersion.

wherein R represents H and R' represents —$CH_2(CH_2)nCH_3$.

Next, 1.0 kg of PVDF (KF1100 from Kureha Corporation) and 200 g of the carbon black dispersion are kneaded using a LABO PLASTOMILL, followed by pelletizing. Thus, a conductive composition pellet is prepared. The pellet is extruded by a melt extruder equipped with a T die, to prepare a film having a thickness of 100 μm.

Example 5

A mixture of 100 g of a carbon black SB4 (from Degussa), 20 g of hexamethylenediamine (HMDA from Aldrich), and pure water is subjected to a bead mill dispersion treatment for 24 hours at 60° C., followed by washing and drying. Thus, an amine-modified carbon black having an amine value of 10 is prepared.

Next, 100 g of the amine-modified carbon black and 100 g of a poly(styrene-co-maleic anhydride) having the following formula (4), as the stiffening agent, are kneaded using a LABO PLASTOMILL (from Toyo Seiki Seisaku-sho, Ltd.), to prepare a carbon black dispersion.

The poly(styrene-co-maleic anhydride) having the formula (4) has a solubility parameter of 18.7.

Next, 1.0 kg of PC (S-3000 from Mitsubishi-Engineering Plastics Corporation) and 200 g of the carbon black dispersion are kneaded using a LABO PLASTOMILL, followed by pelletizing. Thus, a conductive composition pellet is prepared. The pellet is extruded by a melt extruder equipped with a T die, to prepare a film having a thickness of 100 μm.

Example 6

A mixture of 100 g of a carbon black SB4 (from Degussa), 20 g of hexamethylenediamine (HMDA from Aldrich), and pure water is subjected to a bead mill dispersion treatment for 24 hours at 60° C., followed by washing and drying. Thus, an amine-modified carbon black having an amine value of 10 is prepared.

Next, 100 g of the amine-modified carbon black and 10 g of a maleic anhydride (from Aldrich) having the following formula (5), as the stiffening agent, are kneaded using a LABO PLASTOMILL (from Toyo Seiki Seisaku-sho, Ltd.), to prepare a carbon black dispersion.

Next, 1.0 kg of PVDF (KF1100 from Kureha Corporation), 100 g of a poly(styrene-co-butadiene-co-methyl methacrylate) (from Aldrich) having the following formula (6), and 200 g of the carbon black dispersion are kneaded using a LABO PLASTOMILL, followed by pelletizing. Thus, a conductive composition pellet is prepared. The pellet is extruded by a melt extruder equipped with a T die, to prepare a film having a thickness of 100 μm. The film is then exposed to an electron beam from an electron beam irradiator (from NHV Corporation) at an accelerating voltage of 150 kV, an electron dose of 160 kGy, and a feed rate of 100 mm/sec, under nitrogen atmosphere.

Example 7

A mixture of 100 g of a carbon black SB4 (from Degussa), 20 g of hexamethylenediamine (HMDA from Aldrich), and pure water is subjected to a bead mill dispersion treatment for 24 hours at 60° C., followed by washing and drying. Thus, an amine-modified carbon black having an amine value of 10 is prepared.

Next, 100 g of the amine-modified carbon black and 10 g of a maleic polybutene (from NOF Corporation) having the following formula (7), as the stiffening agent, are kneaded using a LABO PLASTOMILL (from Toyo Seiki Seisaku-sho, Ltd.), to prepare a carbon black dispersion. The stiffening agent having the formula (7) has a solubility parameter of 21.5.

wherein each of R and R' represents an alkyl group or a hydrogen atom.

Next, 1.0 kg of PC (S-3000 from Mitsubishi-Engineering Plastics Corporation), 100 g of an ABS resin (from Techno Polymer Co., Ltd.), and 200 g of the carbon black dispersion are kneaded using a LABO PLASTOMILL, followed by pelletizing. Thus, a conductive composition pellet is prepared. The pellet is extruded by a melt extruder equipped with a T die, to prepare a film having a thickness of 100 µm. The film is then exposed to an electron beam from an electron beam irradiator (from NHV Corporation) at an accelerating voltage of 150 kV, an electron dose of 160 kGy, and a feed rate of 100 mm/sec, under nitrogen atmosphere.

Example 8

A mixture of 100 g of a carbon black SB4 (from Degussa), 20 g of hexamethylenediamine (HMDA from Aldrich), and pure water is subjected to a bead mill dispersion treatment for 24 hours at 60° C., followed by washing and drying. Thus, an amine-modified carbon black having an amine value of 10 is prepared.

Next, 100 g of the amine-modified carbon black and 100 g of a poly(bisphenol A-co-epichlorohydrin) glycidyl end-capped (from Aldrich) having the following formula (8), as the stiffening agent, are kneaded using a LABO PLASTOMILL (from Toyo Seiki Seisaku-sho, Ltd.), to prepare a carbon black dispersion.

Next, 1.0 kg of PC (S-3000 from Mitsubishi-Engineering Plastics Corporation) and 200 g of the carbon black dispersion are kneaded using a LABO PLASTOMILL, followed by pelletizing. Thus, a conductive composition pellet is prepared. The pellet is extruded by a melt extruder equipped with a T die, to prepare a film having a thickness of 100 µm.

Example 9

The film prepared in Example 8 is exposed to an electron beam from an electron beam irradiator (from NHV Corporation) at an accelerating voltage of 8 kV, an electron dose of 160 kGy, and a feed rate of 100 mm/sec, under nitrogen atmosphere.

Comparative Examples 1 to 3

The procedures in Examples 1 to 3 were repeated except that the stiffening agent was not added and the carbon black was not treated with amine. Thus, films having a thickness of 100 µm were prepared.

Comparative Example 4

A mixture of 100 g of a carbon black SB5 (from Degussa), 20 g of ethylenediamine (EDA from Aldrich), and pure water is subjected to a bead mill dispersion treatment for 24 hours at 60° C., followed by washing and drying. Thus, an amine-modified carbon black having an amine value of 107 is prepared.

Next, 100 g of the amine-modified carbon black and 100 g of an ethylene-maleic anhydride copolymer BONDINE (from Arkema) having the formula (1), as the stiffening agent, are kneaded using a LABO PLASTOMILL (from Toyo Seiki Seisaku-sho, Ltd.), to prepare a carbon black dispersion.

Next, 1.0 kg of PVDF (KF1100 from Kureha Corporation) and 200 g of the carbon black dispersion are kneaded using a LABO PLASTOMILL, followed by pelletizing. Thus, a conductive composition pellet is prepared. The pellet is extruded by a melt extruder equipped with a T die, to prepare a film having a thickness of 100 µm.

Comparative Example 5

The procedure in Example 1 is repeated except that the stiffening agent is replaced with an ethylene-vinyl acetate copolymer EVATANE (from Arkema) having the following formula (9)

Example 10

The procedure in Example 5 is repeated except that the PC was replaced with polyamide (nylon-6,6 from Aldrich).

Example 11

The procedure in Example 6 is repeated except that the poly(styrene-co-butadiene-co-methyl methacrylate) is replaced with a poly(styrene-co-methyl methacrylate).

Example 12

The procedure in Example 6 is repeated except that the amount of the poly(styrene-co-butadiene-co-methyl methacrylate) is changed from 100 g to 600 g.

Example 13

The procedure in Example 6 is repeated except that the amount of the poly(styrene-co-butadiene-co-methyl methacrylate) is changed from 100 g to 5 g.

Example 14

The procedure in Example 7 is repeated except that the maleic polybutene (from NOF Corporation) is replaced with the maleic anhydride (from Aldrich) having the formula (5).

The compositions and evaluation results are shown in Table 2.

The above results show that the conductive composition according to the present invention has stable electric resistivity, resistance to creep, stretch, and crack, and a long lifespan.

Additional modifications and variations of the present invention are possible in light of the above teachings. It is therefore to be understood that within the scope of the appended claims the invention may be practiced other than as specifically described herein.

What is claimed is:

1. A conductive composition, comprising:
  a matrix resin comprising a thermoplastic resin;
  a conductive agent comprising an amine-modified carbon black having an amine value of 1 to 100 mgKOH/g; and
  a stiffening agent comprising an acid anhydride, a carboxylic acid, or a compound having an epoxy group,
  wherein the amine-modified carbon black and the stiffening agent are previously reacted with each other.

TABLE 2

| | Matrix resin (Solubility parameter) | | | Conductive agent | | | Electron beam Accelerating | |
|---|---|---|---|---|---|---|---|---|
| | Main polymer | Polymer having vinyl group | Stiffening agent | Carbon black | Treatment | Amine value | voltage (kV) | Dose (kGy) |
| Example 1 | PVdF | — | Formula (1) | SB4 | HMDA | 10 | — | — |
| Example 2 | PC (SP = 20.1) | — | Formula (2) | SB5 | HMDA | 9 | — | — |
| Example 3 | PBT | — | Formula (2) | SB4 | HMDA | 10 | — | — |
| Example 4 | PVdF | — | Formula (3) | SB4 | HMDA | 10 | — | — |
| Example 5 | PC (SP = 20.1) | — | Formula (4) | SB4 | HMDA | 10 | — | — |
| Example 6 | PVdF | Formula (6) | Formula (5) | SB4 | HMDA | 10 | 150 | 160 |
| Example 7 | PC (SP = 20.1) | ABS (SP = 20) | Formula (7) | SB4 | HMDA | 10 | 150 | 160 |
| Example 8 | PC (SP = 20.1) | — | Formula (8) | SB4 | HMDA | 10 | — | — |
| Example 9 | PC (SP = 20 1) | — | Formula (8) | SB4 | HMDA | 10 | 150 | 160 |
| Comparative Example 1 | PVdF | — | — | SB4 | — | — | — | — |
| Comparative Example 2 | PC (SP = 20.1) | — | — | SB4 | — | — | — | — |
| Comparative Example 3 | PBT | — | — | SB4 | — | — | — | — |
| Comparative Example 4 | PVdF | — | Formula (1) | SB5 | EDA | 107 | — | — |
| Comparative Example 5 | PVdF | — | Formula (9) | SB4 | HMDA | 10 | — | — |
| Example 10 | PA (SP = 27.8) | — | Formula (4) | SB4 | HMDA | 10 | — | — |
| Example 11 | PVdF | Poly(styrene-co-methyl methacrylate) (having no vinyl group) | Formula (5) | SB4 | HMDA | 10 | 150 | 160 |
| Example 12 | PVdF | Formula (6) | Formula (5) | SB4 | HMDA | 10 | 150 | 160 |
| Example 13 | PVdF | Formula (6) | Formula (5) | SB4 | HMDA | 10 | 150 | 160 |
| Example 14 | PC (SP = 20.1) | ABS (SP = 20) | Formula (5) | SB4 | HMDA | 10 | 150 | 160 |

| | Evaluation results | | | |
|---|---|---|---|---|
| | Crack | Tensile strength (MPa) | Resistivity stability | Mechanical strength |
| Example 1 | GOOD | 54 AVERAGE | GOOD | GOOD |
| Example 2 | GOOD | 68 GOOD | GOOD | GOOD |
| Example 3 | GOOD | 63 GOOD | GOOD | GOOD |
| Example 4 | GOOD | 56 AVERAGE | GOOD | GOOD |
| Example 5 | GOOD | 64 GOOD | GOOD | GOOD |
| Example 6 | GOOD | 65 GOOD | GOOD | GOOD |
| Example 7 | GOOD | 68 GOOD | GOOD | GOOD |
| Example 8 | GOOD | 68 GOOD | GOOD | GOOD |
| Example 9 | GOOD | 68 GOOD | GOOD | GOOD |
| Comparative Example 1 | GOOD | 42 POOR | POOR | GOOD |
| Comparative Example 2 | AVERAGE | 55 AVERAGE | POOR | GOOD |
| Comparative Example 3 | GOOD | 54 AVERAGE | POOR | GOOD |
| Comparative Example 4 | GOOD | 62 GOOD | POOR | GOOD |
| Comparative Example 5 | GOOD | 57 AVERAGE | POOR | GOOD |
| Example 10 | GOOD | 66 GOOD | GOOD | GOOD |
| Example 11 | AVERAGE | 66 GOOD | GOOD | AVERAGE |
| Example 12 | AVERAGE | 67 GOOD | GOOD | AVERAGE |
| Example 13 | AVERAGE | 50 AVERAGE | GOOD | AVERAGE |
| Example 14 | GOOD | 65 GOOD | GOOD | AVERAGE |

2. The conductive composition according to claim 1, wherein the stiffening agent is a copolymer, and a difference in solubility parameter between the matrix resin and at least one of the multiple polymers is 3 or less.

3. The conductive composition according to claim 1, wherein the matrix resin is obtained though processes of melt extrusion and succeeding electron beam exposure.

4. The conductive composition according to claim 1, wherein the matrix resin is a blended polymer comprising multiple polymers, at least one of the multiple polymers having a vinyl group, and
wherein the stiffening agent has a vinyl group.

5. The conductive composition according to claim 4, wherein the matrix resin and the stiffening agent are exposed to electron beam.

6. The conductive composition according to claim 4, wherein a content of the polymer having a vinyl group is 1 to 50% by weight based on a main polymer having a greatest content among the multiple polymers.

7. The conductive composition according to claim 6, wherein a difference in solubility parameter between the polymer having a vinyl group and the stiffening agent is 3 or less.

8. An electrophotographic belt, comprising the conductive composition according to claim 1.

9. The electrophotographic belt according to claim 8, wherein the electrophotographic belt is an intermediate transfer belt.

10. A method of manufacturing a conductive composition according to claim 1, comprising:
melt-kneading a matrix resin comprising a thermoplastic resin, a conductive agent comprising an amine-modified carbon black having an amine value of 1 to 100 mgKOH/g, and a stiffening agent comprising an acid anhydride, a carboxylic acid, or a compound having an epoxy group, so that amino groups on a surface of the carbon black react with functional groups of the stiffening agent; and
extrusion-molding the melt-kneaded composition.

11. The method of manufacturing conductive composition according to claim 10, further comprising exposing the extrusion-molded composition to electron beam.

12. A conductive composition, comprising:
a matrix resin comprising a thermoplastic resin, wherein the matrix resin is obtained though processes of melt extrusion and succeeding electron beam exposure;
a conductive agent comprising a carbon black having an amine value of 1 to 100 mgKOH/g; and
a stiffening agent comprising an acid anhydride, a carboxylic acid, or a compound having an epoxy group.

13. The conductive composition according to claim 12, wherein the stiffening agent is a copolymer, and a difference in solubility parameter between the matrix resin and at least one of the multiple polymers is 3 or less.

14. The conductive composition according to claim 12, wherein the matrix resin is a blended polymer comprising multiple polymers, at least one of the multiple polymers having a vinyl group, and
wherein the stiffening agent has a vinyl group.

15. The conductive composition according to claim 14, wherein a content of the polymer having a vinyl group is 1 to 50% by weight based on a main polymer having a greatest content among the multiple polymers.

16. The conductive composition according to claim 15, wherein a difference in solubility parameter between the polymer having a vinyl group and the stiffening agent is 3 or less.

17. A conductive composition, comprising:
a matrix resin comprising a thermoplastic resin;
a conductive agent comprising a carbon black having an amine value of 1 to 100 mgKOH/g; and
a stiffening agent comprising an acid anhydride, a carboxylic acid, or a compound having an epoxy group;
wherein the matrix resin is a blended polymer comprising multiple polymers, at least one of the multiple polymers having a vinyl group, and
wherein the stiffening agent has a vinyl group
wherein the matrix resin and the stiffening agent are exposed to electron beam.

18. The conductive composition according to claim 17, wherein the stiffening agent is a copolymer, and a difference in solubility parameter between the matrix resin and at least one of the multiple polymers is 3 or less.

19. The conductive composition according to claim 17, wherein a content of the polymer having a vinyl group is 1 to 50% by weight based on a main polymer having a greatest content among the multiple polymers.

20. The conductive composition according to claim 19, wherein a difference in solubility parameter between the polymer having a vinyl group and the stiffening agent is 3 or less.

* * * * *